United States Patent
Bensky et al.

(10) Patent No.: US 6,731,408 B1
(45) Date of Patent: May 4, 2004

(54) METHOD FOR PRODUCING A RASTER SURFACE FOR USE IN THE COLORING OF CONTACT LENS

(75) Inventors: Freddie Bensky, Espoo (FI); Ari Tenhunen, Helsinki (FI)

(73) Assignee: CL - Tinters Oy, Helsinki (FI)

(*) Notice: Subject to any disclaimer, the term of this patent is extended or adjusted under 35 U.S.C. 154(b) by 0 days.

(21) Appl. No.: 09/441,918

(22) Filed: Nov. 17, 1999

(30) Foreign Application Priority Data

Oct. 28, 1999 (FI) .............................................. 19992326

(51) Int. Cl.⁷ ................................................. G02C 7/04
(52) U.S. Cl. ......................................... 358/3.2; 358/3.3
(58) Field of Search ....................... 358/1.9, 3.06–3.09, 358/3.2, 3.29–3.32; 351/160 R, 162

(56) References Cited

U.S. PATENT DOCUMENTS

| 4,582,402 A | 4/1986 | Knapp ........................ 351/162 |
| 4,719,657 A | 1/1988 | Bawa .............................. 8/465 |
| 5,116,112 A | 5/1992 | Rawlings ..................... 351/162 |

FOREIGN PATENT DOCUMENTS

EP 1096296 A2 * 5/2001 ............ G02C/7/04

* cited by examiner

Primary Examiner—Thomas D. Lee
Assistant Examiner—Stephen Brinich
(74) Attorney, Agent, or Firm—Andrus, Sceales, Starke & Sawall, LLP

(57) ABSTRACT

Method for producing a raster surface for use in the coloring of a contact lens, in which method an image surface consisting of picture elements is selected, the image surface is subjected to a tonal reduction operation and a threshold tone value is defined for it, and picture elements darker than the threshold value are made black while picture elements lighter than the threshold value are made white, and the black-and-white image surface is subjected to radial stretching in relation to a given point, the position of said point corresponding to the center of the contact lens to be treated, whereupon a raster pattern for the image to be created on the contact lens can be produced using the image surface, i.e. raster pattern thus obtained.

16 Claims, 8 Drawing Sheets

METHOD FOR PRODUCING A RASTER SURFACE FOR USE IN THE COLORING OF CONTACT LENS

BACKGROUND OF THE INVENTION

The present invention relates to a method for producing a raster surface for use in the coloring of a contact lens.

Today, colored contact lenses are increasingly used as part of an elegant personal outfit with matched toning. As lenses are cheap and easy to use, they have become an essential part of a personal outfit.

A closer look at the iris of the eye reveals that the iris pattern has no geometrically regular forms. The patterning is unique to each person as fingerprints are, which means that there are no two people with identical irises. The iris patterns are radially arranged starting from the center of the pupil. The iris pattern contains elongated or oval shapes extending radially, flexuous, curved or substantially straight fibers and dots of varying size and irregular shape. The pupil may be encircled by a relatively irregular ring-like pattern, i.e. collarette, and in general the circumference of the iris looks darker than its inner areas. In the coloring of shapes and patterns, there is a soft variation in tones.

When the aim is to imitate natural iris patterns as closely as possible, efforts must be founded on the fact that, in order to achieve commercially remunerative products, it must be possible to manufacture them on an industrial scale by utilizing existing printing technology. The iris pattern of the eye mainly consists of such small details that it is technically impossible to print them so that the printed pattern looks photographically equivalent to the original. Traditional raster methods meet certain technical requirements in printing, such as the formation of tones and different colors and correct dosage of toner on the surface being printed. However, traditional dot raster patterns violate the forms of the iris of the eye. In addition, they produce in the iris a disturbing regular pattern that does not look natural.

As the raster technique is still the best method for the coloring of contact lenses as regards printing technology, a definite need has arisen to find a raster pattern that follows the organic patterning of the eye more faithfully than at present and to find a corresponding industrial method for implementing such a raster pattern.

BRIEF SUMMARY OF THE INVENTION

The fundamental idea of the invention is that the raster to be used must follow or resemble the radial patterning of the natural iris. Moreover, the raster patterning must not contain recurrent or regular structures but continuous irregularity. Likewise, the distances between raster dots must vary within selected tolerance limits to meet the requirement of naturalness. In addition, as regards the technical requirements of printing, the raster dot must be sufficiently large to allow it to be printed e.g. on the surface of a contact lens or on a mould.

As for the features characteristic of the invention, reference is made to the claims.

In the method of the invention for producing a raster surface for use in the coloring of a contact lens, at first an image surface consisting of pixels, i.e. picture elements, is selected. The image surface selected may be a suitable surface of a gray tone, consisting of e.g. dots or squares of randomly varying shades. It is also possible to use a monochromatic image surface, i.e. a surface with black and white picture elements disposed at random. The surface as such can be technically implemented in several different ways, using different image processing programs, by artistic means, such as e.g. by spraying a surface with a coloring agent or by photographing a suitable sand surface, sand paper or even the noise pattern on a television screen.

In the method, a selected image surface is subjected to a tonal reduction operation, which means that a threshold tone value is defined for it and picture elements darker than the threshold are made black and picture elements lighter than the threshold are made white. This results in an image surface consisting of black and white picture elements, formed at random. After this, the black-and-white image surface is stretched radially in relation to a given point. The position of this stretching center corresponds to the center of the contact lens to be treated. The image surface, i.e. raster pattern thus obtained can be used with printing methods known in themselves to produce the raster pattern of a picture to be created on the contact lens.

The above description presents the minimum steps by which a raster surface used according to the invention can be produced. However, the image surface is preferably treated by various image processing methods to give the raster pattern the desired appearance. At different stages of the process, the image surface can be subjected to a softening treatment, which means that the image is magnified and then subjected to another tonal reduction treatment, thus giving the raster dots a more rounded shape and therefore a more natural appearance.

If the random image surface in the initial situation is a relatively light surface, then the image surface can be darkened by combining two or more identical image surfaces, i.e. by placing them one upon the other in positions somewhat displaced relative to each other in the direction of the plane of the image. In this way, a darker image surface preserving the stochastic disposition of pixels is produced.

Tonal reduction, softening and darkening operations can be repeated as appropriate until a black-and-white surface having the desired tonal value and consisting of different patterns disposed at varying distances from each other is achieved. However, the irregularly shaped patterns on such a surface with relatively uniform toning must be of a shape that allows them to be printed.

In experiments carried out, it was established that a relatively natural raster pattern is accomplished by stretching the image surface radially by 10–50%. A particularly good result is achieved when the stretching percentage is 15–35%.

The stretching can be performed linearly in a radial direction, but preferably the stretching is performed in a somewhat undulating fashion in the direction of the radius, thus producing a raster pattern looking as natural as possible. On the other hand, it is also possible to apply stretching in other directions as well, e.g. in a radial direction while at the same time rotating the image surface about the center.

By the method of the invention, it is possible to produce any patterns or images on a contact lens. To produce a contact lens iris pattern looking as natural as possible, the image to be created can be based on a picture of the iris of the eye produced manually or by a photographic or reproduction technique or by other methods and then applied to the contact lens by utilizing the raster technique. Another possibility is to build the image to be applied to the contact lens from components, in other words, the image is produced from differentiated pictures taken of different parts of the iris of the eye, produced manually or by a photographic or reproduction technique. Thus, the raster surface used to print the image may consist of e.g. a raster pattern of the iridial element, a raster pattern of the limbic ring and a raster pattern of the inner element, which, when printed one upon the other, form the raster surface to be used.

An advantage provided by the method of the invention as compared with prior-art techniques is above all a natural appearance of the final result. The method of the invention allows industrial and economic production of natural-looking contact lenses, which, in the methods for coloring contact lenses known so far, has only been a distant goal.

BRIEF DESCRIPTION OF THE SEVERAL VIEWS OF THE DRAWING

In the following, the invention will be described in detail with reference to the drawings, wherein.

DETAILED DESCRIPTION OF THE INVENTION

Figure 1:
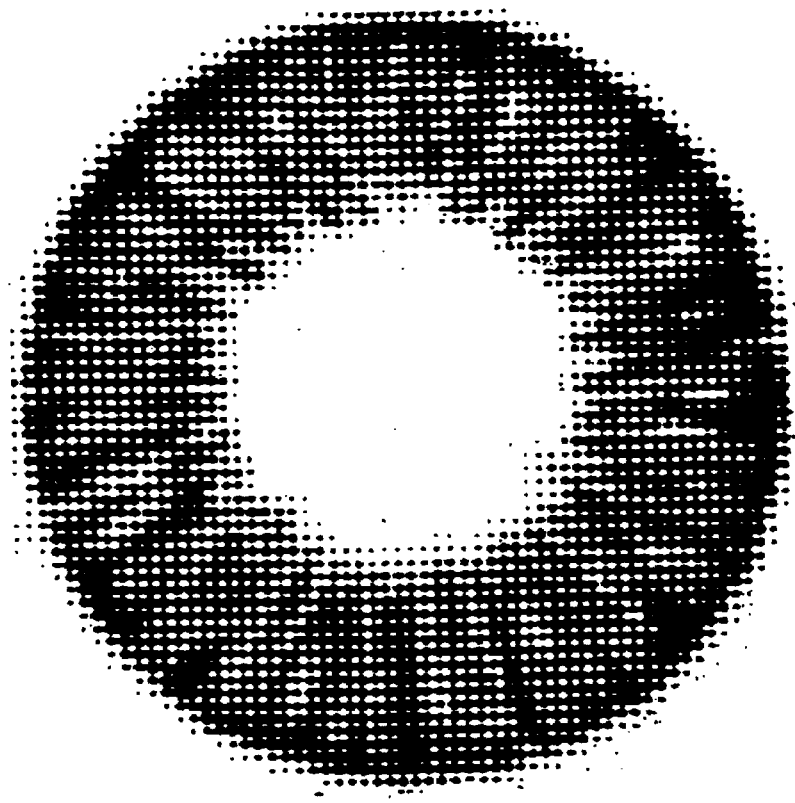
FIG. 1 presents a traditional raster image of an iridial element.

FIG. 1 shows a traditional raster image of the iridial element. As can be seen from the figure, the traditional dot raster makes a highly unnatural picture that violates the organic forms of the iris, forming an unnatural and aesthetically disturbing pattern.

In the following, the various steps and alternative steps of the method of the invention will be described in detail with reference to FIGS. 2–16.

Figure 2:
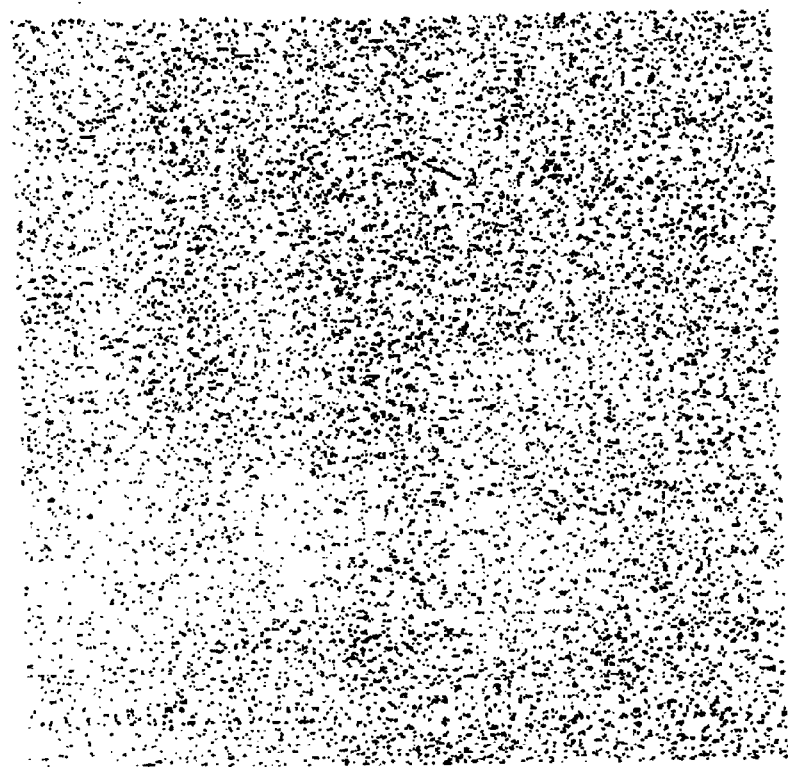
FIG. 2 presents a starting point of the method of the invention.

In the method, an image surface of a gray shade as presented in FIG. 2, consisting of pixels or picture elements whose tonal value varies at random, is selected or formed as a starting point. Such a surface can be formed in many known ways using image processing programs, by artistic means or e.g. by photographing suitable surfaces.

Figure 3:
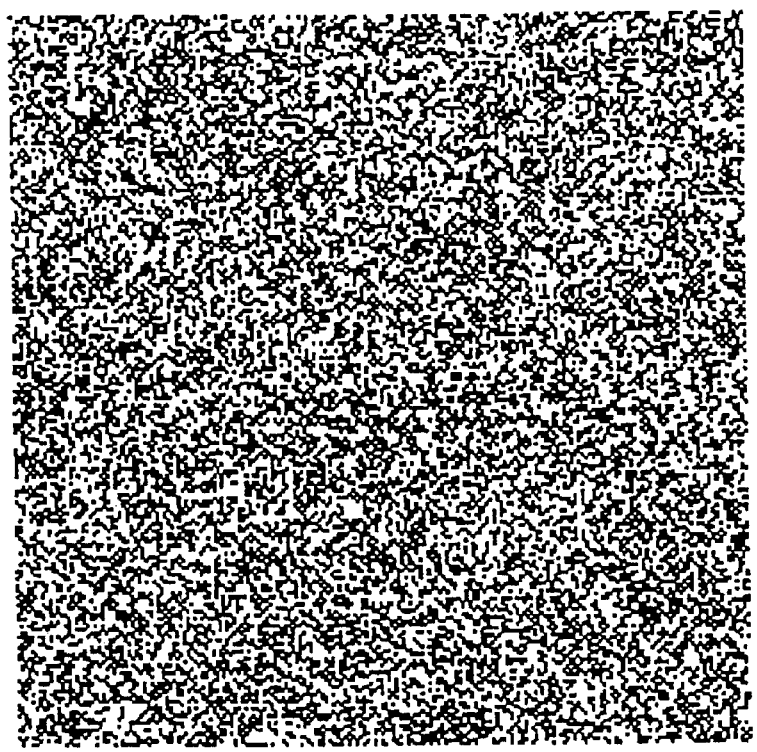
FIG. 3 presents another starting point of the method of the invention.

The basic image surface may also be a noise surface as presented in FIG. 3, i.e. a monochromatic surface with stochastically disposed black and white pixels on it so that, when seen from a distance, the surface forms a relatively smooth gray shade.

The noise surface used as a starting point can be subjected to a tonal reduction in which pixels darker than a given threshold tone value are made black and pixels lighter than the threshold tone value are made white. This results in a black-and-white surface consisting of pixels of irregular shape and size. Often the starting point is a noise surface containing very small pixels. Therefore it is preferable to perform a softening treatment of the image surface, which means magnifying the surface and repeating the tonal reduction operation. This results in larger patterns that are feasible in respect of the technical requirements of printing.

If the image surface produced is found to be too light in tone, it can be darkened by using several image surfaces placed one over the other, i.e. by placing two or more identical image surfaces one upon the other but somewhat displaced in a lateral direction. Thus, the final result of tonal reduction and softening operations and superimposition of image surfaces is a fairly smoothly toned surface e.g. as presented in FIG. 4, in which there are irregularly shaped patterns at varying distances from each other.

Figure 4:
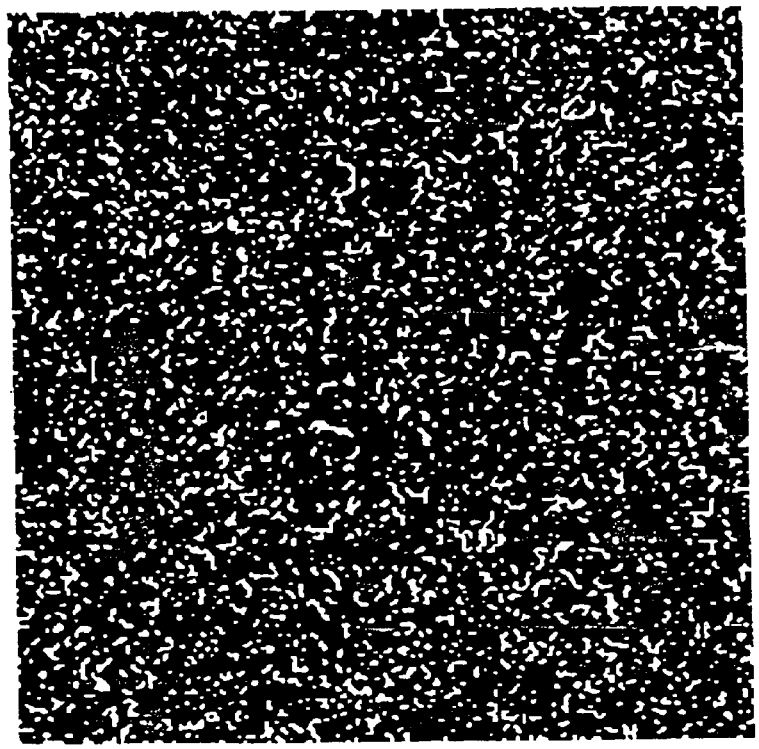
FIG. 4 presents an intermediate stage of the method of the invention.
Figure 5:
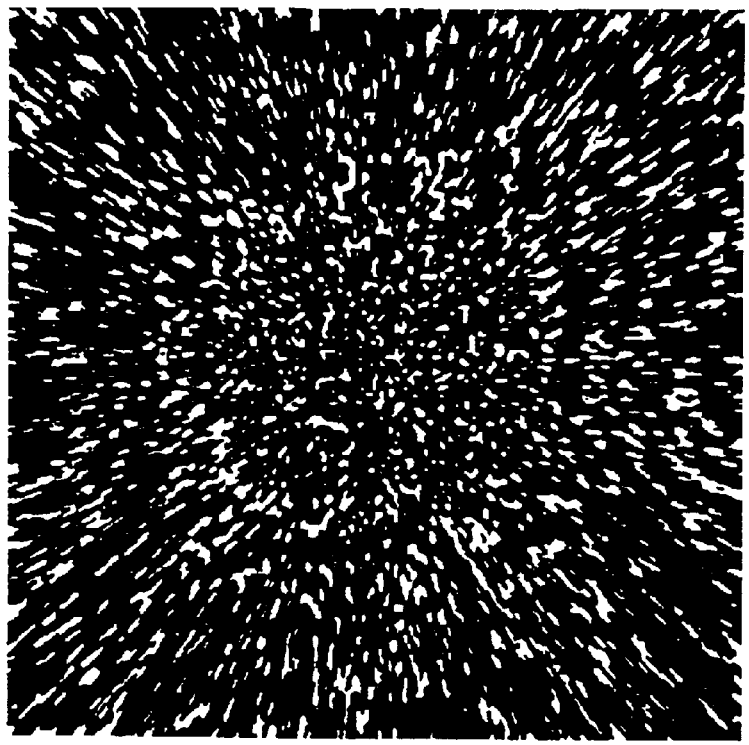
FIG. 5 illustrates a stretching operation that may be used in the method of the invention.
Figure 6:
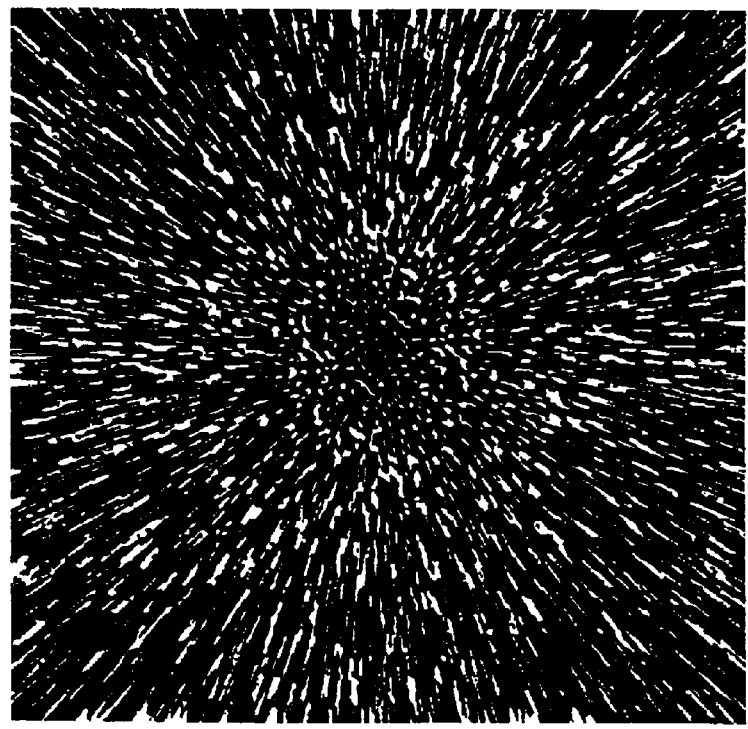
FIG. 6 illustrates another stretching operation that may be used in the method of the invention.
Figure 7:
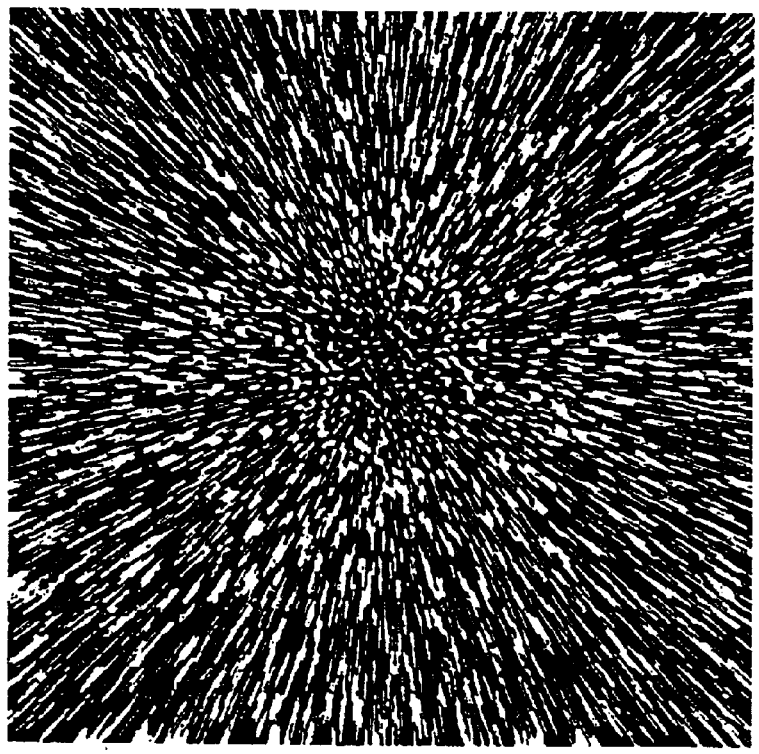
FIG. 7 illustrates a third stretching operation that may be used in the method of the invention.

When the noise pattern in FIG. 4 is stretched radially in all directions by about 15% in relation to the center of the picture, a pattern as presented in FIG. 5 is obtained. If the stretching percentage is a little higher, about 35%, then a pattern as shown in FIG. 6 is obtained. It the stretching percentage is further increased to about 50%, then a pattern as shown in FIG. 7 is obtained. As can be seen from the stretched patterns, the pixels in the patterns become elongated and larger in area while still preserving their irregular shapes and distances from each other.

Figure 8:
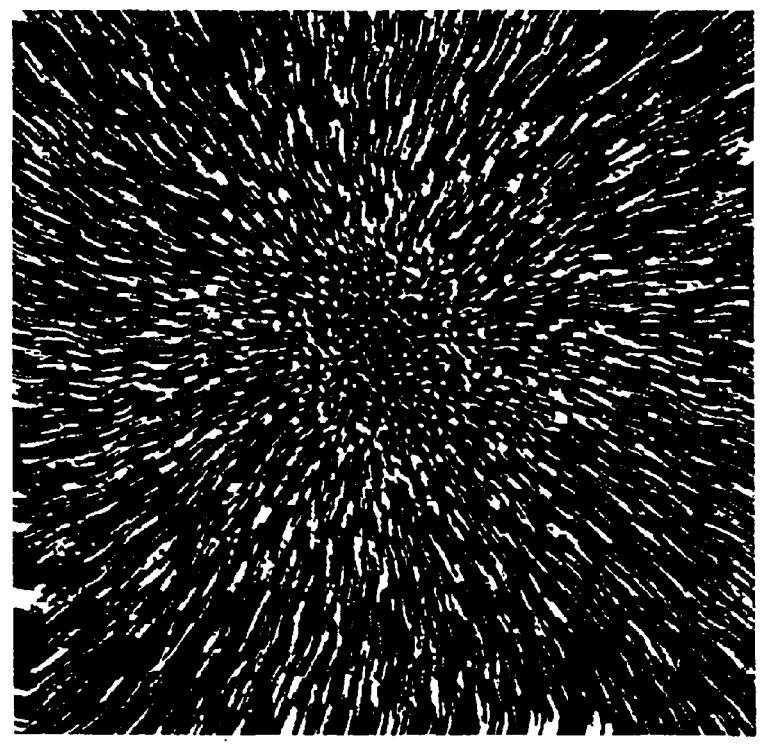
FIG. 8 illustrates a fourth stretching operation that may be used in the method of the invention.

In FIGS. 5–7, the patterns have been stretched linearly in the direction of the radius away from the center. However, as shown in FIG. 8, it is also possible to perform the stretching with a small undulating to-and-fro motion so as to produce a pattern that more closely corresponds to the gentle flexuousness of the fibers in the natural iris pattern.

The raster surfaces presented in FIGS. 5–8, stretched radially with respect to the center, can then be used to produce a raster image of the iris as follows. The iridial element can be e.g. photographed to make a picture as shown in FIG. 9, in which the iridial element is seen in different gray shades between black and white.

Figure 9:
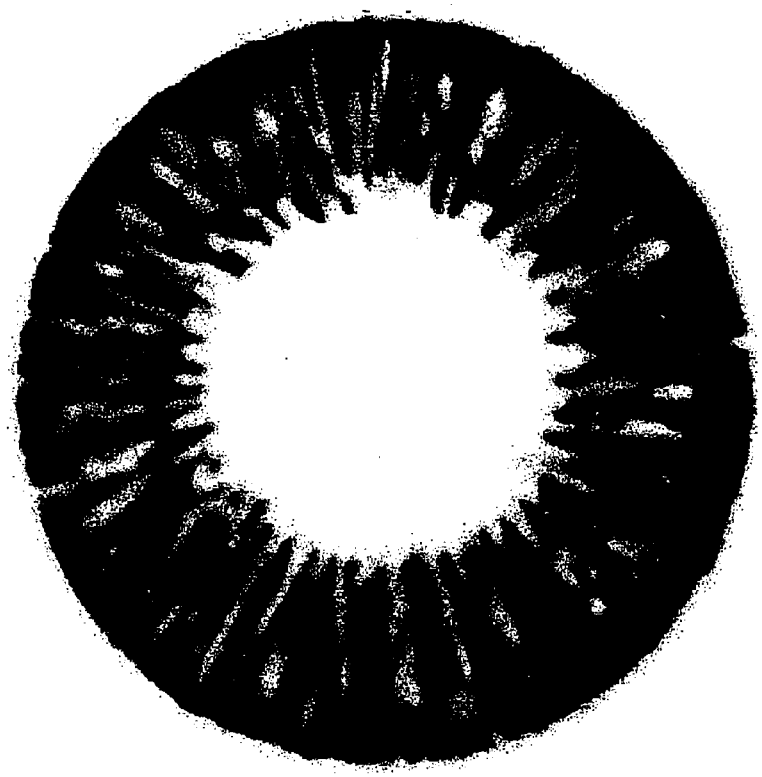
FIG. 9 presents a picture taken of the iridial element of an iris.
Figure 10:
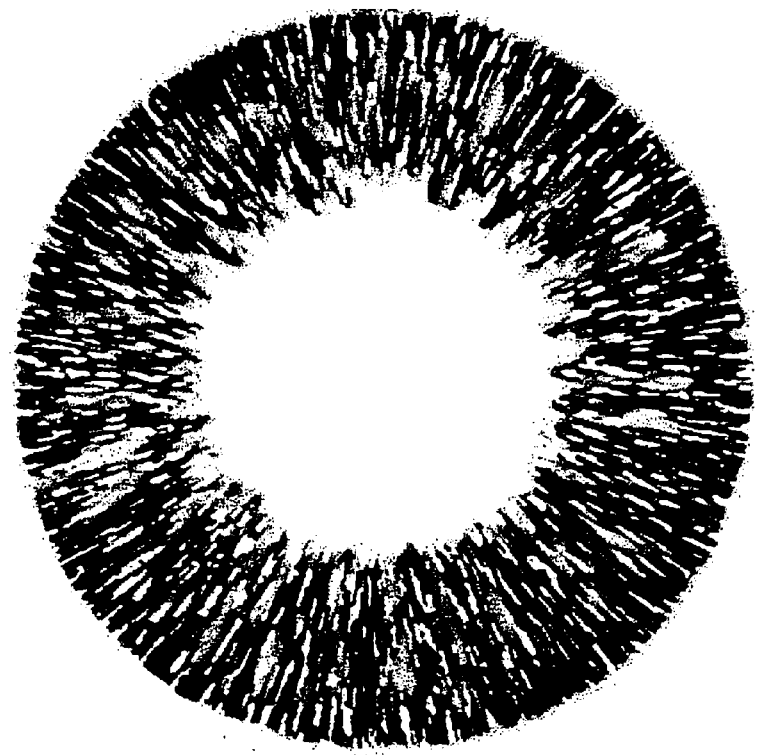
FIG. 10 illustrates an intermediate stage of the making of a raster of the iridial element.

As illustrated in FIG. 10, a raster pattern found to be suitable, e.g. the pattern in FIG. 6, is placed upon the iris pattern in FIG. 9 so that the dark portion of the raster pattern shows the iris pattern under it and the white portion covers it. The image thus produced, as presented in FIG. 10, is subjected to tonal reduction so that tonal values lighter than a threshold tone value are made white and tonal values darker than the threshold tone value are made black. This results in the raster pattern shown in FIG. 11. The threshold tone value may vary relatively freely e.g. between 10 and 90%, depending on the raster surface needed in each case.

Figure 12:
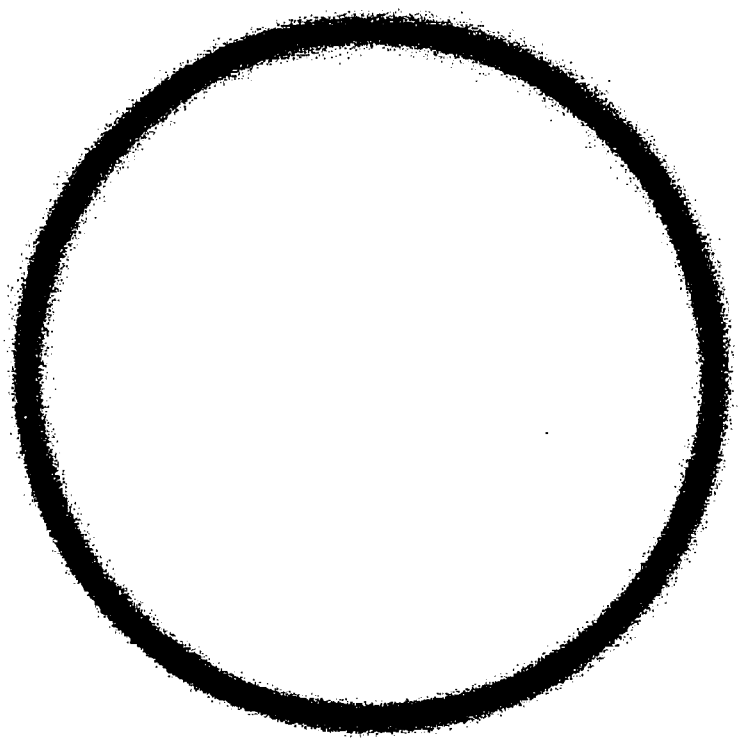
FIG. 12 presents a picture of the limbic ring.
Figure 13:
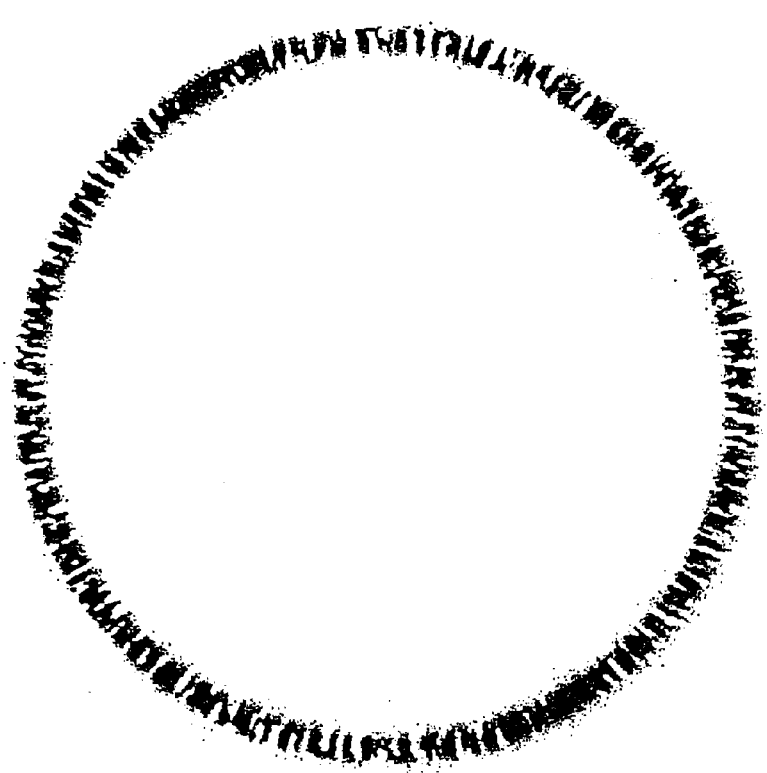
FIG. 13 presents an intermediate stage of the making of a raster of the limbic ring.

FIG. 12 presents a basic image for producing a raster pattern of the limbic ring. The basic image may be a desired kind of limbic pattern, which may be of a relatively regular and uniform shape.

When a stretched raster pattern is placed upon the picture of a limbic ring, the limbic pattern can be seen through the black raster color while the white areas cover it. By subjecting the pattern presented in FIG. 13 to a tonal reduction operation, a limbic ring raster surface as shown in FIG. 14 is obtained.

Figure 15:
FIG. 15 presents a finished raster of the inner element.

In a manner corresponding to those described above, a raster image of the inner element of the iris is produced and a raster surface as presented in FIG. 15 is obtained.

Figure 11:
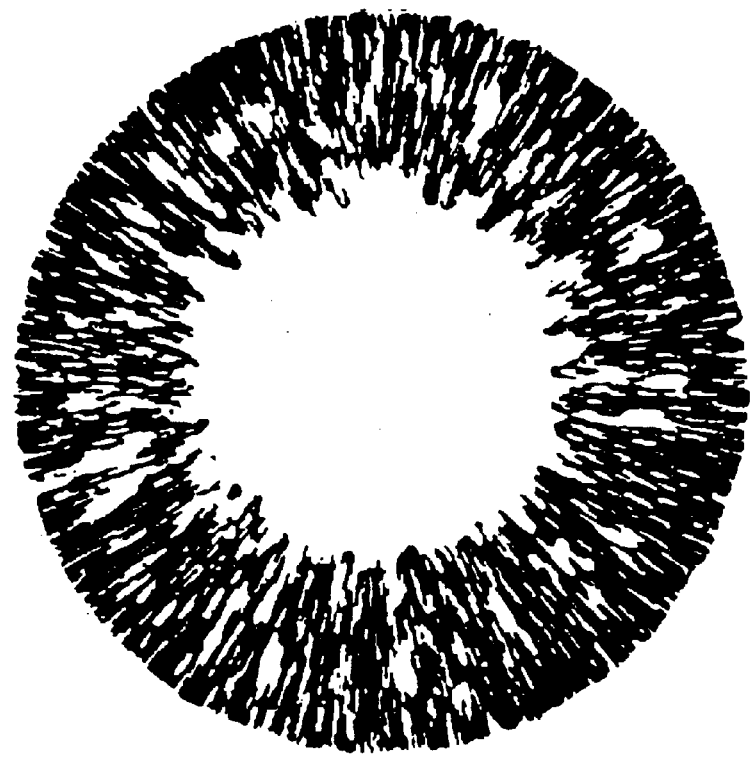
FIG. 11 presents a finished raster of the iridial element.
Figure 14:
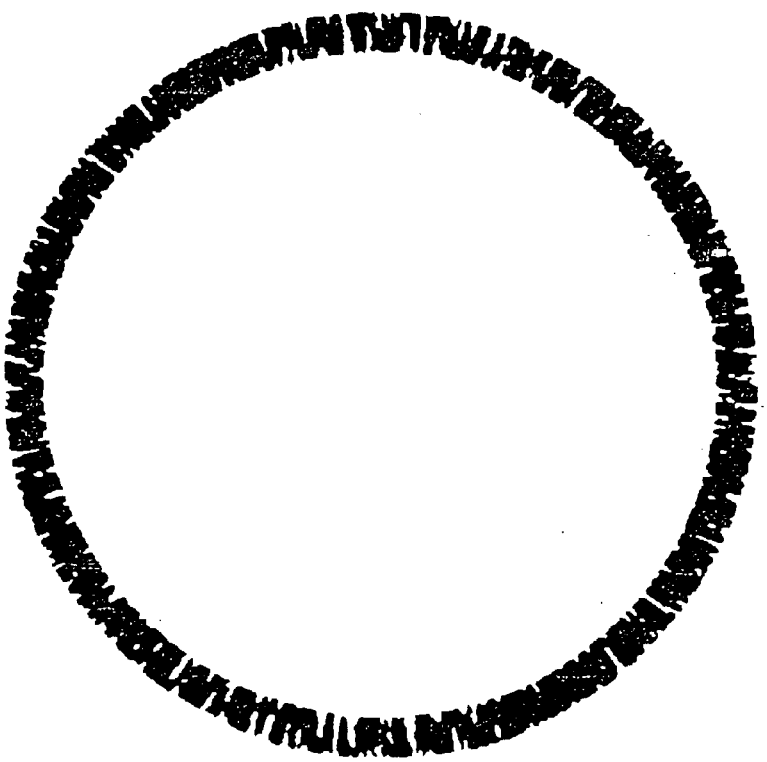
FIG. 14 presents a finished raster of the limbic ring.
Figure 16:
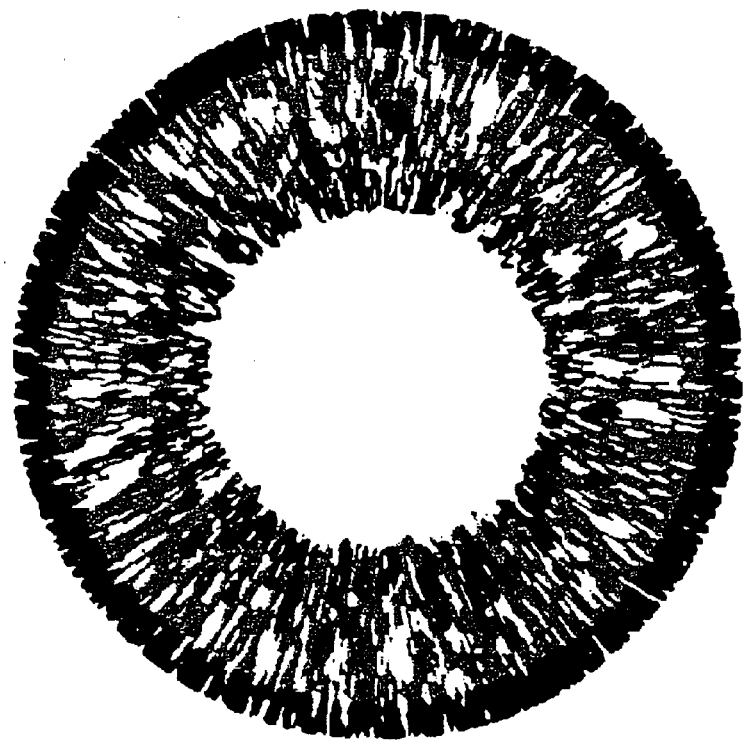
FIG. 16 presents a combination of the three raster surfaces.

When the raster surfaces presented in FIGS. 11, 14 and 15 are combined, i.e. placed one upon the other, the result is a raster surface as shown in FIG. 16, which is free of cyclic patterns and recurrence of patterns and any other kind of systematic phenomena but corresponds as closely as possible to the natural appearance of the iris. The raster surface presented in FIG. 16 can then be used in printing procedures known in themselves when the pattern in question is to be created on a contact lens.

In the foregoing, the invention has been described by way of example with reference to the attached drawings while different embodiments of the invention are possible within the inventive idea defined in the claims.

What is claimed is:

1. A method for producing a raster surface for use in the coloring of a contact lens, the method comprising the steps of:

selecting an image surface consisting of picture elements;

subjecting the image surface to a tonal reduction operation and defining a threshold tone value for the image surface, wherein picture elements darker than the threshold value are made black while picture elements lighter than the threshold value are made white; and subjecting the black-and-white image surface to radial stretching in relation to a given point, the position of said given point corresponding to the center of the contact lens to be treated, wherein a raster pattern for an image to be created on the contact lens can be produced using the radially stretched image surface thus obtained.

2. Method as defined in claim 1, wherein the image surface selected is a surface of a gray tone on which the tone of the picture elements varies in a stochastic manner.

3. Method as defined in claim 1, wherein the image surface selected is a monochromatic surface with black and white picture elements randomly disposed on it.

4. Method as defined in claim 1, wherein the image surface is subjected to a softening operation.

5. Method as defined in claim 1, wherein the image surface is darkened by placing two or more image surfaces one upon the other.

6. Method as defined in claim 4, wherein the softening operation is repeated one or more times.

7. Method as defined in claim 1, wherein in the radial stretching operation, the image surface is stretched by 10–50%.

8. Method as defined in claim 1, wherein in the radial stretching operation, the image surface is stretched by 15–35%.

9. Method as defined in claim 1, wherein the stretching is performed linearly in the direction of the radius.

10. Method as defined in claim 1, wherein the stretching is performed in an undulating fashion in the direction of the radius.

11. Method as defined in claim 1, wherein the stretching is performed in the direction of the radius while at the same time rotating the surface in one direction.

12. Method as defined in claim 1, wherein a picture of the iris of the eye produced manually or by a photographic or reproduction technique is used as a starting point for the image to be created on the contact lens.

13. Method as defined in claim 1, wherein differentiated pictures of parts of the iris of the eye produced manually or by a photographic or reproduction technique are used as starting points for the image to be created on the contact lens.

14. The method as defined in claim 1, wherein the image surface is magnified and subjected to a repeated tonal reduction operation.

15. The method as defined in claim 14, wherein the tonal reduction operation is repeated one or more times.

16. The method as defined in claim 5, wherein the darkening operation is repeated one or more times.

* * * * *